ns
United States

[11] 3,609,009

| [72] | Inventors | Robert D. Lohman |
| | | Princeton; |
| | | Gerard A. Alphonse, Princeton; Walter F. Kosonocky, Skillman, all of N.J. |
| [21] | Appl. No. | 799,020 |
| [22] | Filed | Feb. 13, 1969 |
| [45] | Patented | Sept. 28, 1971 |
| [73] | Assignee | RCA Corporation |

[54] BINARY LIGHT BEAM DEFLECTOR USING ACOUSTIC WAVES
2 Claims, 5 Drawing Figs.

| [52] | U.S. Cl. | 350/161 |
| [51] | Int. Cl. | G02f 1/28 |
| [50] | Field of Search | 350/161, 162 |

[56] References Cited
UNITED STATES PATENTS

| 3,419,322 | 12/1968 | Adler | 350/161 |
| 3,424,906 | 1/1969 | Korpel | 350/161 X |
| 3,484,147 | 12/1969 | Collier | 350/161 X |
| 3,516,729 | 6/1970 | Adler | 350/161 |

OTHER REFERENCES

Gordon, " A Review of Acoustdoptical Deflection and Modulation Devices" Proc. of IEEE, Vol. 54, No. 10, Oct. 1966, pp. 1391– 1401.

*Primary Examiner*—Ronald L. Wibert
*Assistant Examiner*—T. Major
*Attorney*—H. Christoffersen ABSTRACT: A binary light beam deflector is disclosed which includes a medium, such as water or quartz, which is transparent to an incident light beam. Two electroacoustic transducers are positioned to propagate acoustic waves of the same frequency through the medium so that each acoustic wave intercepts the incident beam at an angle equal to the Bragg angle. A radiofrequency oscillator is connected to one or the other of the transducers to cause deflection of the light beam in one or the other of two output directions. A plurality of the described deflectors may be arranged in cascade to provide any desired amount of deflection in binary steps.

INVENTORS
Robert D. Lohman,
Gerard A. Alphonse and
Walter F. Kosonocky

BY *Carl V. Olson*
ATTORNEY

3,609,009

BINARY LIGHT BEAM DEFLECTOR USING ACOUSTIC WAVES

BACKGROUND OF THE INVENTION

This invention relates to means for accomplishing the binary deflection of a light beam, such as a laser beam, for use in optical memories, logical processors of optical information signals and display arrangements in computers and computer peripheral equipments. Light beam deflectors including mechanically moving mirrors and the like are both slow and expensive. A more promising known binary light beam deflector is one constructed of electro-optic crystals arranged in cascade and each supplied with a binary electrical control signal. However, arrangements including electro-optic crystals are very expensive to construct, require a large amount of electric power to operate, and have numerous other limitations. It is also known that a light beam passing through a medium can be diffracted to produce a deflected output beam by the presence of an acoustic wave propagated through the medium. The utilization of this principle in binary applications has been impeded by difficulties including a lack of equality in the intensities of output light beams, by a lack of a desired spatial symmetry, and by a necessity for a source of electrical oscillations having many different frequencies.

SUMMARY OF THE INVENTION

According to a preferred embodiment of the invention, an incident light beam directed through a transparent medium is diffracted to produce one or the other of two equally deflected, different output beams depending on whether one or the other of two angularly related electroacoustic transducers on, or in, the medium is energized from a single source of constant radio frequency electrical oscillations. A plurality of the described light deflector units may be arranged in cascade to provide any desired amount of deflection in one or two directions.

DETAILED DESCRIPTION

Figure 1:
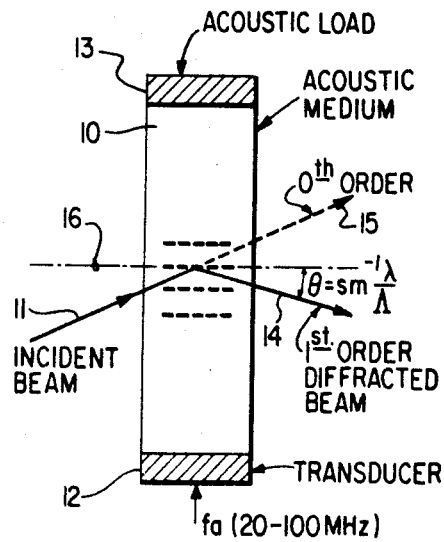
FIG. 1 is a diagram of a prior art device employing an acoustic wave to deflect an incident light beam.

Reference is made to FIG. 1 for a description of a prior art light beam deflector comprising an acoustic medium 10 such as water or quartz or acousto-optic crystal which is transparent to an incident light beam 11. One side of the medium 10 is provided with an electroacoustic transducer 12 which is supplied with radio frequency electrical energy to cause an acoustic wave of corresponding frequency to be propagated through the medium 10 to an acoustic absorber 13. The incident light beam 11 is diffracted by the acoustic wave to a direction 14 as a first-order diffracted beam. The zero-order undiffracted output beam is represented at 15.

The acoustic wave front has an orientation represented at 16. The angle $\theta$ between the wave front 16 and the incident beam 11, and between the wave front 16 and diffracted 14 is given by the formula sine $\theta = a/A$, where $a$ is the wavelength of the light beam in the medium 10, and $A$ is the wavelength of the acoustic wave in medium 10. The angle $\theta$ is known as the Bragg angle. The angle between the zero-order output 15 and the first-order diffracted beam 14 is equal to twice the Bragg angle $\theta$. The prior art light deflector shown in FIG. 1 is not suitable for use in a cascaded arrangement because the incident and output light beams are nonsymmetrically related to the optical axis 16 of the unit, and because the two output light signals are of different intensities. Further information on the principles of acoustic deflection of light may be found in an article by A. Korpel et al. at pages 1,667 through 1,675 in the Oct., 1966, issue of *Applied Optics* magazine, and in an article by E. I. Gordon at pages 1,391 through 1,401 in the Oct. 1966, issue of the *Proceedings of the IEEE*.

Figure 2:
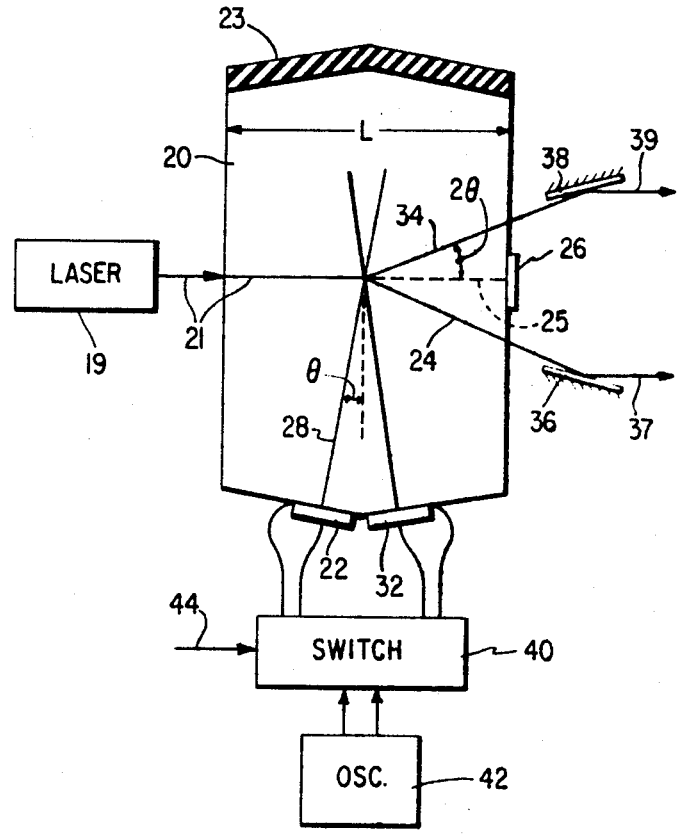
FIG. 2 is a diagram of a binary light deflector constructed according to the teachings of this invention.

Reference is now made to FIG. 2 for a description of a binary light beam deflecting unit constructed according to the teachings of this invention. A light beam from a source such as a laser 19 is directed over the path 21 to and through a medium 20 which is transparent to the light beam and which is adapted for the propagation there through of an acoustic wave. The medium 20 may, for example, be water or quartz or any acousto-optic crystal. If the medium 20 is water, it is contained by any suitable means such as a plastic container having transparent walls where the light beam enters and leaves the medium. The wall at the output side of the medium is provided with a light baffle 26 to trap or absorb the undeflected light beam 25 and prevent it from appearing at the output side of the deflector unit. The medium 20 has a dimension $L$ in the direction of the incident light beam, and this dimension will be referred to in connection with discussions of deflection efficiencies of the unit.

An electro-acoustic transducer 22 is positioned on a wall of the medium 20 to generate an acoustic wave which propagates through the medium in a direction 28 which intersects the light beam 21 at an angle which is the complement of the so-called Bragg angle. Stated another way, the propagation of an acoustic wave in the direction 28 results in an acoustic wave front which intersects the light beam 21 at the Bragg angle. The Bragg angle is represented in the drawing as the angle $\theta$, and it is in an angle whose sine is equal to the wavelength of the light beam 21 divided by the wavelength of the acoustic wave 28. The presence of the acoustic wave from the transducer 20 causes the incident light beam 21 to be diffracted and thereby produce a deflected output beam 24. The output beam 24 represents the first-order diffraction components of the incident beam. The zero-order undeflected portion of the incident beam is blocked by the mask 26. The output beam 24 is diffracted or deflected angularly an amount equal to 20, or twice the Bragg angle.

The medium 20 is also provided with a second electroacoustic transducer 32 which is symmetrically positioned with relation to transducer 22 so that it also produces an acoustic wave front which intersects the incident light beam 21 at the Bragg angle. An acoustic wave from transducer 32 causes a diffraction or deflection of the incident beam in the output direction 34. The output light beam 34 is similarly related by the angle $2\theta$ with the direction of the incident beam 21, which corresponds with the optical axis of the deflection unit. It is thus seen that the incident light beam 21 is deflected as an output beam 24, or as an output beam 34, depending on whether the as an output beam 34, depending on whether the transducer 22 or the transducer 32 is energized.

The output beam 24 is redirected by a mirror 36 to a path 37 that is parallel with the optical axis of the unit. Similarly, a reflector 38 reflects the output beam 34 to a direction 39 parallel with the optical axis of the unit.

The electro-acoustic transducers 22 and 32 are known transducers constructed, for example, of a piezoelectric material such as cadmium sulfide having evaporated metallic electrical terminals on two opposite faces. The two terminals of each transducer are electrically connected through a switch 40 to a radio-frequency oscillator 42. The switch 40 is conventionally constructed to connect the output of oscillator 42 to one or the other of the transducers 22 and 32 in accordance with an input control signal applied at 44 to the switch 40. The oscillator 42 is constructed to provide radio-frequency oscillations at a suitable frequency such as 50 megahertz.

Although the electro-acoustic transducers 22 and 32 are shown and described as discrete units positioned along a side of the medium 20, it will be understood by those skilled in the art that the medium 20 may itself be an integral part of the transducers. That is, the medium 20 may be a lithium niobate crystal, and the transducers may be constituted of electrostatic electrodes and the crystal itself Alternatively, the medium 20 may be an electro-optic material such as potassium-tentalate niobate and the transducers may include sources of microwave electrical energy.

In choosing an appropriate frequency for the oscillator 42, and for the resulting acoustic waves, account must be taken of the particular medium 20 that is employed. The desired diffraction occurs when the acoustic wave front intercepts the light beam at the Bragg angle $\theta$, which is the angle whose sine is equal to the ratio of the wavelength of the light beam to the wavelength of the acoustic wave. The frequency of the oscillations is proportional to the velocity of the acoustic wave in the medium. The velocity of an acoustic wave in a water medium is 1,500 meters per second, and in a fused quartz medium is 5,968 meters per second. It is therefore apparent that the frequency of the oscillator 42 must be selected in accordance with the velocity of propagation of an acoustic wave through the particular medium employed in order to produce a desired acoustic wavelength in the medium. The actual acoustic wavelength in the medium in relation to the wavelength of a light beam, determines the Bragg angle and therefore determines the angle $2\theta$, of deflection of the output beam.

The efficiency of deflection depends on the dimension $L$ along the optical axis of the medium 20, which represents the region of interaction between the light beam and the acoustic wave. That is, the dimension $L$ should be long enough so that substantially all of the incident beam 21 is directed to one of the output directions 24 or 34, and so that very little of the incident beam proceeds along the undeflected path 25. It is theoretically possible to get a 100-percent deflection of the incident light beam 21 if the length $L$ is such as to satisfy the equation:

$$L = \frac{a}{n^3 P} \cdot \frac{pv_a^3 S}{2P_a}$$

where $a$ is the wavelength of the light beam, $n$ is the index of refraction of the medium 20, $p$ is the density of the medium, $P$ is the photoelastic constant of the material, $v_a$ is the velocity of the acoustic wave in the medium, $P_a$ is the power of the acoustic wave, and $S$ is the area of the medium.

When a number of deflection units as shown in FIG. 2 are to be used in cascade, the deflection efficiencies are very important. It is therefore desirable to construct each element or unit with a dimension $L$ equal to about twice that given by the above formula. If the medium 20 is water, a convenient frequency for oscillator 42 is 50 megahertz, and this results in a Bragg angle of 1°, and a deflection of the output beam an amount equal to 2° relative to the incident beam or optical axis of the unit. The oscillator 42 should provide an output radio-frequency power in the neighborhood of 1 watt.

The speed with which the incident beam 21 is diffracted following the time when the switch 40 is energized depends on the time required for the acoustic wave to be propagated from the electro-acoustic transducer to a point of intersection with the incident light beam 21. This response time depends primarily on the velocity of acoustic propagation in the particular medium employed, and the physical distance from the transducer to the region of interaction with the light beam. The velocity of acoustic propagation in quartz is 0.17 microseconds per millimeter. The light beam may have a cross-sectional diameter of 1 millimeter, and the light beam may pass through the medium 20 at a point several, or many, millimeters from the transducers 22, 32. In a deflection system including seven cascaded units, each being of the type shown in FIG. 2, for providing any one of 128 spaced output beams, the longest acoustic propagation distance in the last of the cascaded units may result in a worst-case access time of about 21 microseconds in a quartz medium, or about 84 microseconds in a water medium.

Figure 3:
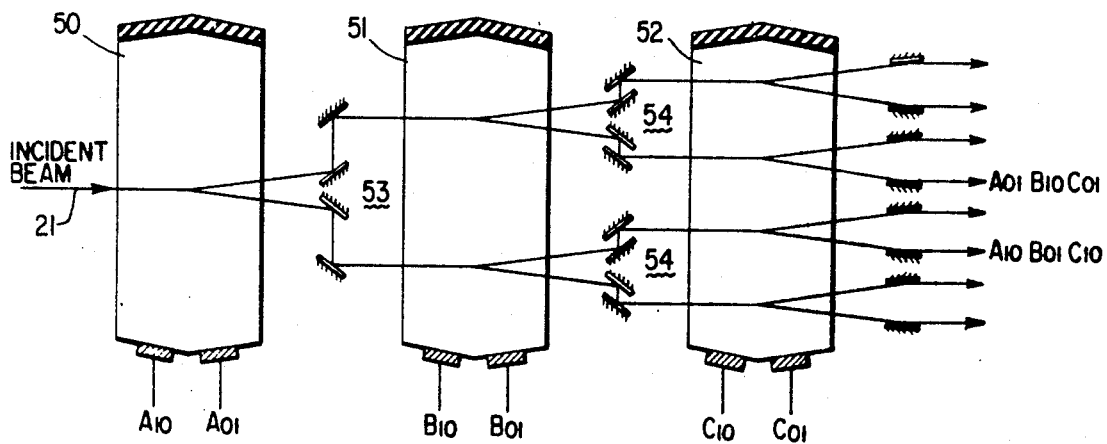
FIG. 3 is a diagram of a plurality of binary light deflectors as shown in FIG. 2 arranged in cascade for successively deflecting a light beam.

FIG. 3 shows a cascaded arrangement of three deflector units 50, 51, 52 of the type shown in FIG. 2. All of the units shown in FIG. 3 are identical and all receive electrical oscillations of the same frequency from an oscillator and switch (not shown). Therefore, each deflector unit in FIG. 3 deflects its incident beam by the same angular amount in one or the other of the two directions. In order that all of the eight possible output paths will be equally spaced, pairs of double reflectors 53, 54 are used between the units with a greater spacing between the individual reflectors of the pairs at 53 than between the individual reflectors of the pairs at 54.

Figure 4:
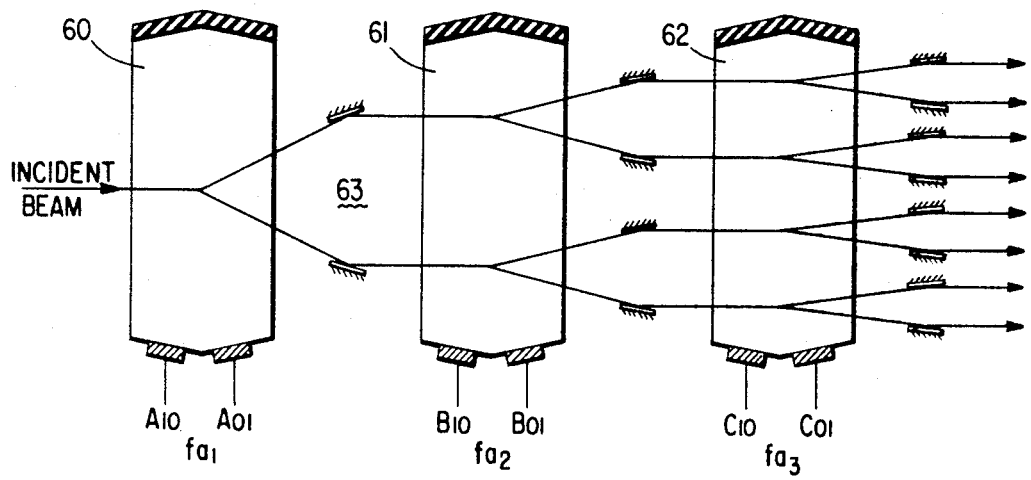
FIG. 4 is a cascaded arrangement of binary deflectors differing from the arrangement shown in FIG. 3 in that different acoustic wave frequencies are employed in the successive units to provide different degrees of deflection therein.

FIG. 4 shows a cascaded arrangement of three deflector units 60, 61 and 62 similar to the ones shown in FIG. 2 but differing from each other in that different radio frequency electrical signals are applied to the transducers of the three units. That is, a highest frequency oscillation is applied to the first unit 60 to provide a maximum amount of deflection in the two output directions. In this case, only two reflectors at 63 are needed between the first and second deflector units 60 and 61. A lower frequency electrical oscillation is applied to the transducers of the second deflection unit 61, and a lowest frequency oscillation is applied to the transducers of the third deflection unit 62. In this way, progressively less deflection is provided in successive deflection units, with the result that the eight possible light output beams from the cascaded assembly are equally spaced.

Figure 5:
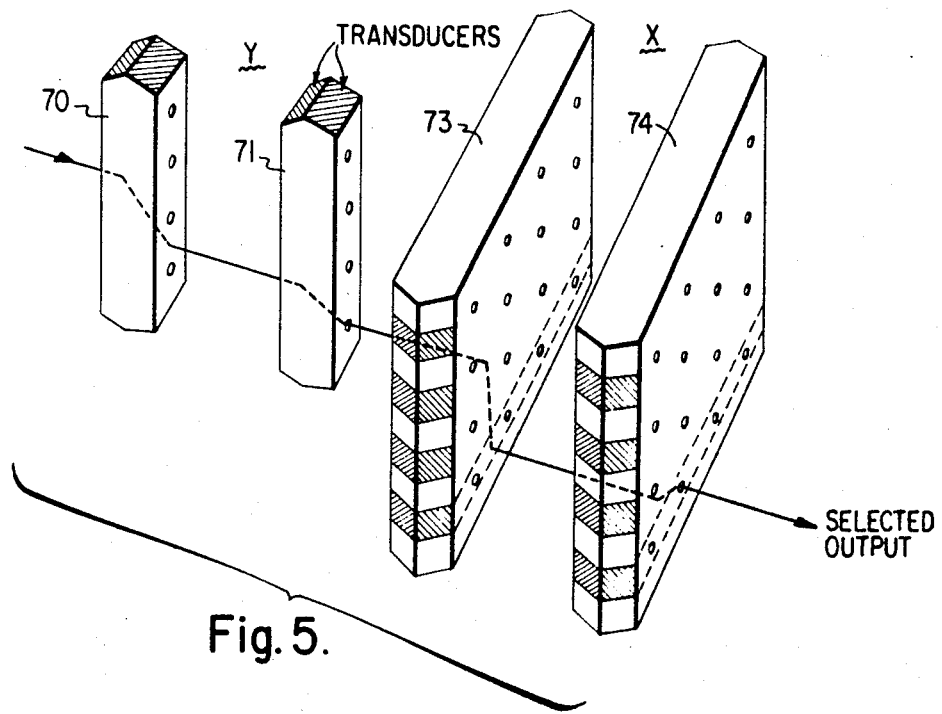
FIG. 5 is an assembly of binary deflectors for accomplishing deflection of a light beam in both the Y-direction and the X-direction.

FIG. 5 is a perspective view illustrating two cascaded deflection units 70, 71 arranged for providing deflection of the incident beam to any one of four positions in the Y-direction, followed by a plurality of deflection units arranged in two stacks 73, 74 to provide deflection of the beam in the X-direction. The system illustrated permits the incident beam to be deflected to any one of 16 output paths that are parallel with the optical axis of the system. The interstage mirrors shown in FIGS. 3 and 4 are omitted in FIG. 5 for reasons of clarity of illustration.

What is claimed is:

1. Deflector means to deflect an incident light beam in either one of two divergent directions within a plane, comprising
   a medium which is transparent to said light beam and through which an acoustic wave can be propagated,
   means to direct said incident light beam through said medium,
   first and second spaced electro-acoustic transducers positioned to propagate two respective acoustic waves of the same wavelength through said medium in different directions within said plane so that the wavefront of each acoustic wave intercepts the incident light beam at an angle equal to the Bragg angle,
   means to mask the undiffracted zero order portion of the incident light beam emerging from said medium,
   means to energize one transducer to cause an output comprising the first order diffraction portion of the light beam diverged in one direction,
   means to energize the other transducer to cause an equal intensity output diverged an equal amount in the other direction, and
   fixed reflectors positioned on the output side of said medium to redirect the diffracted output light beams to directions that are parallel with the incident light beam.

2. A plurality of light beam deflectors each as defined in claim 1 arranged in cascade so that a diffracted output light beam from one deflector constitutes an incident light beam for the next following deflector, said means to energize said transducers including an electrical oscillator, and switch means to selectively connect the output of said oscillator to one transducer of each light deflector.

75